(12) United States Patent
Golash et al.

(10) Patent No.: US 10,169,133 B2
(45) Date of Patent: Jan. 1, 2019

(54) METHOD, SYSTEM, AND APPARATUS FOR DEBUGGING NETWORKING MALFUNCTIONS WITHIN NETWORK NODES

(71) Applicant: Juniper Networks, Inc., Sunnyvale, CA (US)

(72) Inventors: Mukul Golash, Bangalore (IN); Kushal Dhar, Agartala (IN); Saikat Sanyal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 155 days.

(21) Appl. No.: 15/138,458

(22) Filed: Apr. 26, 2016

(65) Prior Publication Data

US 2017/0308422 A1    Oct. 26, 2017

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *G06F 11/0751* (2013.01); *G06F 11/0787* (2013.01); *H04L 41/0631* (2013.01)

(58) Field of Classification Search
CPC ............. G06F 11/0709; G06F 11/0751; G06F 11/0769; G06F 11/0787; G06F 11/079; H04L 41/0631; H04L 41/0636; H04L 41/065
See application file for complete search history.

(56) References Cited

U.S. PATENT DOCUMENTS

| | | | |
|---|---|---|---|
| 6,658,598 B1* | 12/2003 | Sullivan | G06F 11/2294 714/25 |
| 7,385,716 B1* | 6/2008 | Skaanning | G06F 11/0733 358/1.14 |
| 8,924,787 B2 | 12/2014 | Lumezanu et al. | |
| 9,189,317 B1* | 11/2015 | Marinnuthu | G06F 11/366 |
| 9,479,416 B2* | 10/2016 | Black | H04L 41/145 |
| 9,891,971 B1* | 2/2018 | Kuhhirte | G06F 11/0709 |

(Continued)

FOREIGN PATENT DOCUMENTS

EP        2256623 A2    12/2010
WO    WO 2013/112288 A1    8/2013

*Primary Examiner* — Marc Duncan
(74) *Attorney, Agent, or Firm* — FisherBroyles, LLP

(57) ABSTRACT

The disclosed computer-implemented method for debugging network nodes may include (1) detecting a computing event that is indicative of a networking malfunction within a network node, (2) determining, based at least in part on the computing event, one or more potential causes of the networking malfunction, (3) identifying one or more debugging templates that each define debugging steps that, when performed by a computing system, enable the computing system to determine whether the networking malfunction resulted from any of the potential causes, (4) performing a set of debugging steps defined by one of the debugging templates that corresponds to one of the potential causes, and then (5) determining, based at least in part on the set of debugging steps defined by the debugging template, that the networking malfunction resulted from the potential cause. Various other methods, systems, and apparatuses are also disclosed.

18 Claims, 10 Drawing Sheets

(56) References Cited

U.S. PATENT DOCUMENTS

| | | | | |
|---|---|---|---|---|
| 10,055,275 B2* | 8/2018 | Razin | .................... | G06F 11/079 |
| 2001/0051937 A1 | 12/2001 | Ross et al. | | |
| 2002/0107919 A1* | 8/2002 | Arai | ...................... | G06F 11/079 |
| | | | | 709/203 |
| 2009/0034411 A1* | 2/2009 | Bernard | .................. | H04L 41/06 |
| | | | | 370/221 |
| 2010/0229022 A1* | 9/2010 | Anand | .................. | G06F 11/079 |
| | | | | 714/2 |
| 2014/0047274 A1* | 2/2014 | Lunnezanu | ......... | G06F 11/3006 |
| | | | | 714/37 |
| 2015/0271008 A1* | 9/2015 | Jain | ..................... | H04L 41/0686 |
| | | | | 714/57 |
| 2016/0274962 A1* | 9/2016 | Fortune | ................. | G06F 11/079 |
| 2016/0357625 A1* | 12/2016 | Balakrishnan | ...... | G06F 11/0709 |
| 2017/0019291 A1* | 1/2017 | Tapia | .................. | H04L 41/0631 |
| 2017/0099179 A1* | 4/2017 | Iwamura | ............. | H04L 41/0631 |
| 2017/0286199 A1* | 10/2017 | Soini | .................... | G06F 11/0709 |
| 2018/0173586 A1* | 6/2018 | Birkler | ................ | G06F 11/0703 |

* cited by examiner

METHOD, SYSTEM, AND APPARATUS FOR DEBUGGING NETWORKING MALFUNCTIONS WITHIN NETWORK NODES

BACKGROUND

Debugging network nodes is often a tedious endeavor. In many cases, these network nodes may trigger an alarm and/or event that necessitates interpretation by a human operator with a high level of expertise. In such cases, the human operator may turn to a reference manual to interpret and/or understand the alarm and/or event. Additionally or alternatively, the human operator may rely on technical support. Unfortunately, as the number of network nodes increases so too does the amount of debugging information. At some point, such debugging information may reach an amount that is simply too much for the human operator to handle manually.

As a specific example, a human operator that manages a network may see a graphical representation of an alarm and/or event displayed on his or her computing device. After being unable to determine the cause of the alarm and/or event based on reference manuals, Command-Line Interface (CLI) dumps, and/or event logs, the human operator may contact technical support at a Technical Assistance Center (TAC). In this example, technical support may evaluate the cause of the alarm and/or event based on relevant CLI dumps and/or event logs. The human operator and/or technical support may even reproduce the configuration of the network and/or the operations running at the time of the alarm and/or event in an effort to collect any additional information that is potentially relevant to determining the root cause.

Unfortunately, these debugging procedures may require extensive human and/or computing resources. Even with such resources, these debugging procedures may lead to misdiagnoses and/or no diagnosis at all (especially when reproduction of the problem is infeasible). The instant disclosure, therefore, identifies and addresses a need for additional and improved methods, systems, and apparatuses for debugging networking malfunctions within network nodes.

SUMMARY

As will be described in greater detail below, the instant disclosure generally relates to methods, systems, and apparatuses for debugging networking malfunctions within network nodes. In one example, a method for accomplishing such a task may include (1) detecting a computing event that is indicative of a networking malfunction within a network node, (2) determining, based at least in part on the computing event, one or more potential causes of the networking malfunction, (3) identifying one or more debugging templates that each define debugging steps that, when performed by a computing system, enable the computing system to determine whether the networking malfunction resulted from any of the potential causes, (4) performing a set of debugging steps defined by one of the debugging templates that corresponds to one of the potential causes, and then (5) determining, based at least in part on the set of debugging steps defined by the debugging template, that the networking malfunction resulted from the potential cause.

Similarly, a system for implementing the above-described method may include (1) a detection module, stored in memory, that detects a computing event that is indicative of a networking malfunction within a network node, (2) a determination module, stored in memory, that determines, based at least in part on the computing event, one or more potential causes of the networking malfunction, (3) an identification module, stored in memory, that identifies one or more debugging templates that each define debugging steps that, when performed by a computing system, enable the computing system to determine whether the networking malfunction resulted from any of the potential causes, (4) a debugging module, stored in memory, that (A) performs a set of debugging steps defined by one of the debugging templates that corresponds to one of the potential causes and then (B) determines, based at least in part on the set of debugging steps defined by the debugging template, that the networking malfunction resulted from the potential cause, and (5) at least one physical processor that executes the detection module, the determination module, the identification module, and the debugging module.

An apparatus for implementing the above-described method may include (1) a memory device that stores debugging templates that define debugging steps for debugging networking malfunctions and (2) a processing unit communicatively coupled to the memory device, wherein the processing unit (A) detects a computing event that is indicative of a networking malfunction within a network node, (B) determines, based at least in part on the computing event, one or more potential causes of the networking malfunction, (C) identifies one or more debugging templates that are stored in the memory device and each define debugging steps that, when performed by a computing system, enable the computing system to determine whether the networking malfunction resulted from any of the potential causes, (D) performs a set of debugging steps defined by one of the debugging templates that corresponds to one of the potential causes, and then (E) determines, based at least in part on the set of debugging steps defined by the debugging template, that the networking malfunction resulted from the potential cause.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
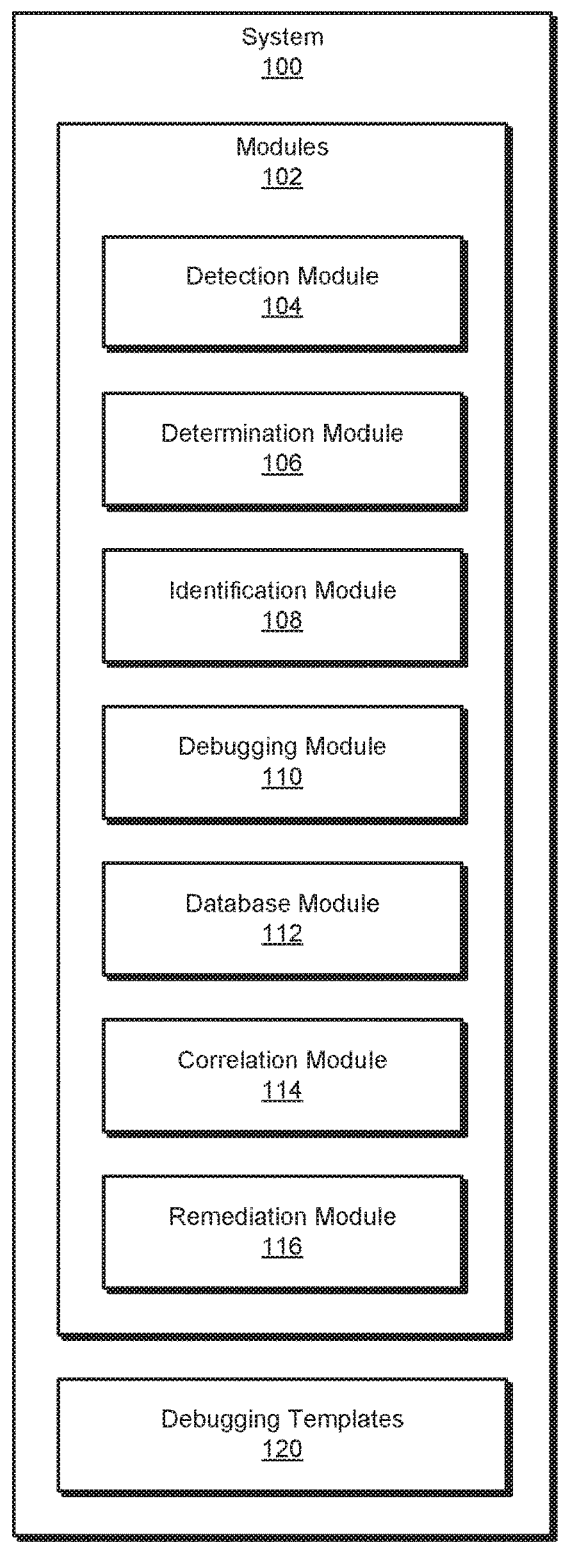
FIG. 1 is a block diagram of an exemplary system for debugging networking malfunctions within network nodes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for debugging networking malfunctions within network nodes. As will be explained in greater detail below, systems and methods described herein may provide a debugging architecture and/or framework that facilitates automated debugging support and/or remediation within a network environment. By providing this debugging architecture and/or framework, the systems and methods described herein may mitigate and/or eliminate the need for human interaction in debugging networking malfunctions.

Additionally or alternatively, the systems and methods described herein may improve the amount of resource consumption that is involved in debugging networking malfunctions. For example, a human operator may collect various relevant and irrelevant debug information across network nodes. In contrast, the systems and methods described herein may collect only relevant information and filter out irrelevant information through progressive data collection and correlation, thereby reducing resource consumption and providing faster convergence in the debugging process. Moreover, these systems and methods may improve the diagnostic capabilities of the debugging process by decreasing the number of false positives and/or false negatives.

The following will provide, with reference to FIGS. 1, 2, 5, and 9, detailed descriptions of exemplary systems for debugging networking malfunctions within network nodes. Detailed descriptions of corresponding computer-implemented methods will be provided in connection with FIG. 3. Detailed descriptions of exemplary computing events will be provided in connection with FIGS. 4 and 7. Detailed descriptions of exemplary sets of debugging steps will be provided in connection with FIGS. 6 and 8. In addition, detailed descriptions of an exemplary computing system capable of implementing one or more of the embodiments described herein will be provided in connection with FIG. 10.

FIG. 1 is a block diagram of an exemplary system 100 for debugging networking malfunctions within network nodes. As illustrated in this figure, exemplary system 100 may include one or more modules 102 for performing one or more tasks. For example, and as will be explained in greater detail below, exemplary system 100 may include a detection module 104 that detects a computing event that is indicative of a networking malfunction within a network node. Exemplary system 100 may also include a determination module 106 that determines, based at least in part on the computing event, one or more potential causes of the networking malfunction.

In addition, exemplary system 100 may include an identification module 108 that identifies one or more debugging templates that each define debugging steps that, when performed by a computing system, enable the computing system to determine whether the networking malfunction resulted from any of the potential causes. Moreover, exemplary system 100 may include a debugging module 110 that (1) performs a set of debugging steps defined by one of the debugging templates that corresponds to one of the potential causes and then (2) determines, based at least in part on the set of debugging steps defined by the debugging template, that the networking malfunction resulted from the potential cause.

Exemplary system 100 may further include a database module 112 that builds and/or maintains a collection of debugging templates and/or a results database. In addition, exemplary system 100 may include a correlation module 114 that correlates multiple computing events and/or root causes of such events across multiple network nodes. Finally, exemplary system 100 may include a remediation module 116 that (1) notifies at least one administrator that the networking malfunction resulted from the potential cause and/or (2) remedies the networking malfunction by addressing the potential cause. Although illustrated as separate elements, one or more of modules 102 in FIG. 1 may represent portions of a single module or application (such as a network operating system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., network nodes 202(1)-(N) and/or server 206) and/or computing system 1000 in FIG. 10. One or more of modules 102 in FIG. 1 may also represent all or portions of one or more special-purpose computers configured to perform one or more tasks.

As illustrated in FIG. 1, system 100 may also include one or more debugging templates, such as debugging templates 120. In one example, debugging templates 120 may be included in and/or represented as a collection and/or database. In this example, debugging templates 120 may each define a set of debugging steps that, when performed by a computing system, enable the computing system to determine whether a networking malfunction resulted from a certain cause. In other words, debugging templates 120 may each include some instructions that, when followed and/or executed, facilitate determining whether a networking malfunction resulted from a certain cause.

In some examples, each of debugging templates 120 may correspond to a different potential cause of a networking malfunction. For example, one of debugging templates 120 may correspond to a specific cause of a networking malfunction. In this example, the specific cause may be an error produced by an Application-Specific Integrated Circuit (ASIC) included on a Switch Interface Board (SIB) within a network node. This debugging template may include a set of debugging steps that, when performed by a computing system, enable the computing system to determine whether an error produced by an ASIC on a SIB within a network node is the source and/or root cause of a networking malfunction on the network node. This debugging process may be initiated as a result of and/or in response to a computing event that is indicative of the networking malfunction.

In some examples, one or more of debugging templates 120 may be generically applicable to all network and/or node configurations. For example, a debugging template may direct a computing system to correctly perform the corresponding debugging steps on any type or form of network node and/or platform from any vendor. Additionally or alternatively, a debugging template may direct a computing system to correctly perform the corresponding debugging steps on any type or form of ASIC and/or Field-Replaceable Unit (FRU) within a network node. Moreover, a debugging template may direct a computing system to correctly perform the corresponding debugging steps on any type or form of hardware and/or software within a network node regardless of the version and/or release. Accordingly, such debugging templates and/or steps may function correctly irrespective of the underlying platform, vendor, ASIC type, FRU type, and/or release.

In some examples, one or more of debugging templates 120 may include certain debugging steps that are specific to a particular network and/or node configuration. For example, a debugging template may direct a computing system to perform debugging steps specifically designed for a particular type of network node and/or platform from a particular vendor. Additionally or alternatively, a debugging template may direct a computing system to perform debugging steps specifically designed for a particular type of ASIC and/or FRU within a network node. Moreover, a debugging template may direct a computing system to perform debugging steps specifically designed for a particular version and/or release of hardware and/or software within a network node. Accordingly, such debugging templates and/or steps may function correctly irrespective of the underlying platform, vendor, ASIC type, FRU type, and/or release.

In some examples, one or more of debugging templates 120 may be represented as and/or converted into a tree data structure. As a specific example, a debugging template may be formatted as a tree that includes (1) a first hierarchical level representative of network nodes (such as routers, switches, and/or chasses), (2) a second hierarchical level representative of physical components within such network nodes (such as FRUs), (3) a third hierarchical level representative of logical groupings of physical components that are capable of producing the same networking malfunction, and/or (4) a fourth hierarchical level representative of the debugging steps to be performed on and/or in connection with the physical components included in the logical groupings.

Although debugging templates 120 are generally represented as a plurality and/or collection (as opposed to a single debugging template), debugging templates 120 may alternatively be consolidated and/or represented as a single debugging template. For example, a single debugging template may include and/or identify all of the debugging steps for all of the potential causes of networking malfunctions within network 204. Additionally or alternatively, the single debugging template may include and/or identify a hierarchy of network-related physical entities and/or logical groupings. Accordingly, this single debugging template may enable a computing system to identify the network topology, all relevant hardware components within the network nodes, and/or all debugging steps to be performed on network nodes under evaluation.

Figure 2:
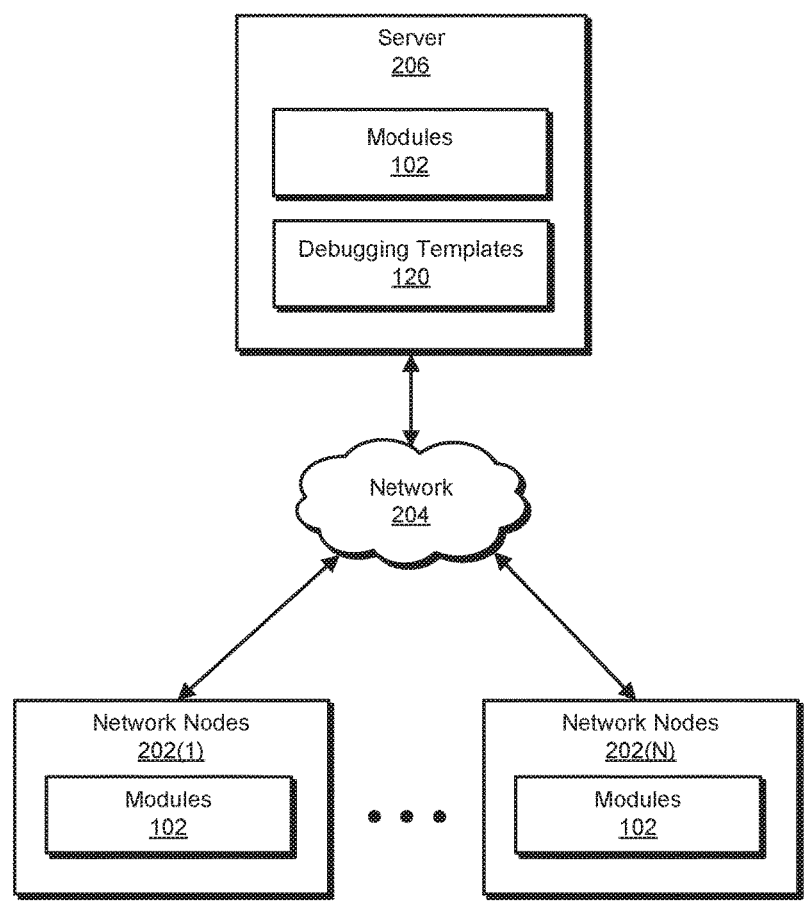
FIG. 2 is a block diagram of an exemplary system for debugging networking malfunctions within network nodes.

Exemplary system 100 in FIG. 1 may be implemented in a variety of ways. For example, all or a portion of exemplary system 100 may represent portions of exemplary system 200 in FIG. 2. As shown in FIG. 2, system 200 may include and/or represent a server 206 in communication with one or more network nodes 202(1)-(N). Although FIG. 2 illustrates server 206 and network nodes 202(1)-(N) as being external to network 204, server 206 and/or network nodes 202(1)-(N) may alternatively represent part of and/or be included in network 204. Moreover, although FIG. 2 illustrates server 206, system 200 may alternatively exclude server 206 and/or perform the steps and/or functionalities described herein in connection with server 206 through one or more of network nodes 202(1)-(N).

In one example, server 206 may be programmed with one or more of modules 102. In this example, server 206 may include, store, and/or maintain one or more of debugging templates 120.

Additionally or alternatively, one or more of network nodes 202(1)-(N) may be programmed with one or more of modules 102. In this example, one or more of network nodes 202(1)-(N) may include, store, and/or maintain one or more of debugging templates 120 (although not illustrated in this way in FIG. 2). Although FIG. 2 illustrates network nodes 202(1)-(N) as being programmed with modules 102, network nodes 202(1)-(N) may additionally or alternatively be programmed with other modules that are not illustrated in FIG. 2.

In one example, one or more of modules 102 from FIG. 1 may, when executed by at least one processor of server 206 and/or one of network nodes 202(1)-(N), enable server 206 and/or the network node to debug networking malfunctions within network nodes. For example, and as will be described in greater detail below, one or more of modules 102 may cause server 206 and/or one of network nodes 202(1)-(N) to (1) detect a computing event (such as computing event 400 in FIG. 4 or computing event 700 in FIG. 7) that is indicative of a networking malfunction within one of network nodes 202(1)-(N), (2) determine, based at least in part on the computing event, one or more potential causes of the networking malfunction, (3) identify debugging templates 120 that each define debugging steps that, when performed by server 206 or the network node, enable server 206 or the network node to determine whether the networking malfunction resulted from any of the potential causes, (4) perform a set of debugging steps defined by one of debugging templates 120 that corresponds to one of the potential causes, and then (5) determine, based at least in part on the set of debugging steps defined by that debugging template, that the networking malfunction resulted from that potential cause.

Network nodes 202(1)-(N) each generally represent any type or form of computing system, device, and/or mechanism that facilitates communication and/or the flow of network traffic within a network and/or across networks. Examples of network nodes 202(1)-(N) include, without limitation, routers, switches, hubs, modems, bridges, repeaters, gateways, multiplexers, network adapters, network racks, chasses, portions of one or more of the same, combinations or variations of one or more of the same, and/or any other suitable network devices.

Server 206 generally represents any type or form of computing device computing system, device, and/or mechanism that performs debugging or diagnostics and/or distributes debugging templates to network nodes. Examples of server 206 include, without limitation, debugging servers, diagnostic servers, security servers, application servers, web servers, storage servers, and/or database servers configured to run certain software applications and/or provide various debugging, diagnostic, security, web, storage, and/or database services.

Network 204 generally represents any medium or architecture capable of facilitating communication and/or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, combinations or variations of one or more of the same, and/or any other suitable network. Network 204 may facilitate communication or data transfer using wireless and/or wired connections. In one embodiment, network 204 may facilitate communication among server 206 and network nodes 202(1)-(N).

Figure 3:
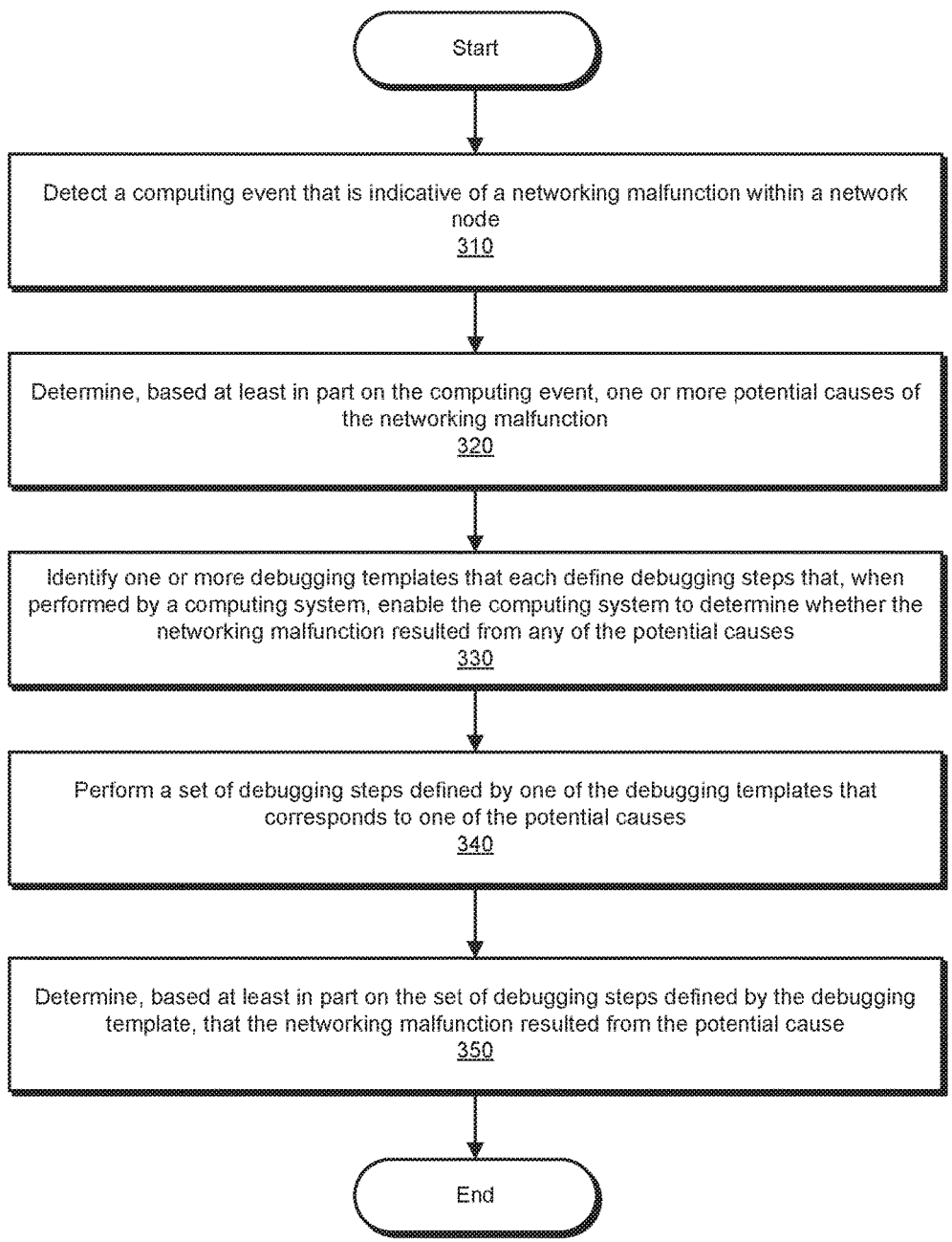
FIG. 3 is a flow diagram of an exemplary method for debugging networking malfunctions within network nodes.

FIG. 3 is a flow diagram of an exemplary computer-implemented method 300 for debugging networking malfunctions within network nodes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 1000 in FIG. 10.

As illustrated in FIG. 3, at step 310 one or more of the systems described herein may detect a computing event that is indicative of a networking malfunction within a network node. For example, detection module 104 may, as part of server 206 and/or network node 202(1) in FIG. 2, detect a computing event that is indicative of a networking malfunction within network node 202(1). In one example, the computing event may include and/or represent an alarm raised by network node 202(1) or another computing device attempting to communicate with network node 202(1). Additionally or alternatively, the computing event may include and/or represent an entry made and/or reported in an event log of network node 202(1) or another computing device attempting to communicate with network node 202(1).

The term "networking malfunction," as used herein, generally refers to any type or form of error, issue, and/or failure that impairs the performance and/or functionality of a network node. In one example, the networking malfunction may include and/or represent a hardware failure that impairs a network node's ability to forward and/or transfer network traffic from one computing device to another. In another example, the networking malfunction may include and/or represent a software bug and/or error that prevents a network node from forwarding and/or transferring network traffic as intended and/or expected.

The systems described herein may perform step 310 in a variety of ways and/or contexts. In some examples, detection module 104 may detect the computing event by monitoring network 204 and/or network node 202(1) for any performance and/or communication problems. For example, detection module 104 may monitor network 204 and/or network node 202(1). While monitoring network 204 and/or network node 202(1), detection module 104 may detect various computing events. In one example, one of these computing events may indicate and/or suggest that network node 202(1) is malfunctioning in one way or another.

Returning to FIG. 3, at step 320 one or more of the systems described herein may determine, based at least in part on the computing event, one or more potential causes of the networking malfunction. For example, determination module 106 may, as part of server 206 and/or network node 202(1), determine and/or identify one or more potential causes of the networking malfunction. In this example, determination module 106 may make and/or arrive at this determination based at least in part on the computing event.

The systems described herein may perform step 320 in a variety of ways and/or contexts. In some examples, determination module 106 may determine any potential causes of the networking malfunction by looking up the detected computing event in a knowledge base (not illustrated in FIG. 2). For example, database module 112 may, as part of server 206 and/or network node 202(1), build a knowledge base that includes various data and/or information about network 204 and/or potential causes of networking malfunctions within network 204. In this example, the knowledge base may include and/or identify the configuration of network 204 and/or one or more of network nodes 202(1)-(N). Additionally or alternatively, the knowledge base may include debugging templates 120 and/or debugging steps.

In one example, database module 112 may build the knowledge base from user input received from a user. For example, detection module 104 may receive user input from a software developer and/or an administrator of network 204. In this example, the user input may include and/or identify the topology of network 204 and/or the identity or type of one or more of network nodes 202(1)-(N). Additionally or alternatively, the user input may include and/or identify a set of debugging steps that enable a computing system (such as server 206 and/or network node 202(1)) to perform in the event that a certain computing event is detected. By performing the set of debugging steps as instructed in the user input, the computing system may be able to determine the root cause(s) of the networking malfunction.

Continuing with this example, database module 112 may create one or more of debugging templates 120 such that these debugging templates define the set of debugging steps identified in the user input. Each of debugging templates 120 may correspond to a different potential cause of a networking malfunction. For example, one of debugging templates 120 may correspond to an ASIC error, and another one of debugging templates 120 may correspond to an error produced by a Physical Interface Card (PIC).

Additionally or alternatively, database module 112 may associate debugging templates 120 and/or their corresponding causes with at least one computing event. For example, database module 112 may associate the debugging template corresponding to the ASIC error with a specific alarm and/or log event in accordance with user input. Similarly, database module 112 may associate the debugging template corresponding to the PIC error with the same alarm and/or log event in accordance with user input.

Database module 112 may then create a record of these associations within the knowledge base to facilitate determining and/or identifying any potential causes of that alarm and/or log event. This record may serve as and/or identify a logical grouping of all of the hardware and/or software components that represent potential root causes of a particular networking malfunction. Accordingly, these hardware and/or software components may each be able to produce the alarm and/or log event indicative of the networking malfunction, thereby creating some ambiguity as to the root cause.

In response to the detection of that alarm and/or log event, determination module 106 may search the knowledge base for any known sources and/or root causes of that alarm and/or log event. In other words, the knowledge base may identify all sources and/or root causes that are capable of producing that alarm and/or log event. During the search of the knowledge base, determination module 106 may determine and/or identify the ASIC error and/or the PIC error as potential causes of the alarm and/or log event.

Returning to FIG. 3, at step 330 one or more of the systems described herein may identify one or more debugging templates that each define debugging steps that, when performed by a computing system, enable the computing system to determine whether the networking malfunction resulted from any of the potential causes. For example, identification module 108 may, as part of server 206 and/or network node 202(1), identify one or more of debugging templates 120 that each define debugging steps and/or instructions. When performed by server 206 and/or network node 202(1), these debugging steps and/or instructions may enable server 206 and/or network node 202(1) to determine whether the networking malfunction resulted from any of the potential causes.

The systems described herein may perform step 330 in a variety of ways and/or contexts. In some examples, identification module 108 may identify any debugging templates that correspond to potential causes of the detected computing event. For example, identification module 108 may search debugging templates 120 within the knowledge base for any debugging templates that correspond to the potential causes and/or have been associated with a specific alarm and/or log event. During this search, identification module 108 may identify all of debugging templates 120 that correspond to the potential causes and/or have been associated with a specific alarm and/or log event.

As a specific example, one of these debugging templates may correspond to the ASIC error. Another one of these debugging templates may correspond to the PIC error. Alternatively, a single debugging template may include multiple sections that collectively correspond to the ASIC error and the PIC error.

In some examples, the identified debugging templates may enable server 206 and/or network node 202(1) to determine whether the networking malfunction resulted from any of the potential causes. For example, the debugging template corresponding to the ASIC error may enable server 206 and/or network node 202(1) to determine whether the alarm and/or log event resulted at least in part from such an ASIC error. Similarly, the debugging template corresponding to the PIC error may enable server 206 and/or network node 202(1) to determine whether the alarm and/or log event resulted at least in part from such a PIC error.

Returning to FIG. 3, at step 340 one or more of the systems described herein may perform a set of debugging steps defined by one of the debugging templates that corresponds to one of the potential causes. For example, debugging module 110 may, as part of server 206 and/or network node 202(1), perform a set of debugging steps defined by one of debugging templates 120 that corresponds to one of the potential causes. The term "debugging step," as used herein, generally refers to any type or form of instruction and/or command that is directed to checking and/or determining whether one or more specific conditions are met in connection with a network node. In one example, the debugging steps may be directed to looking for and/or attempting to identify certain parameter values that are out of range and/or certain log events that occurred within a specific time period and/or interval.

Figure 4:
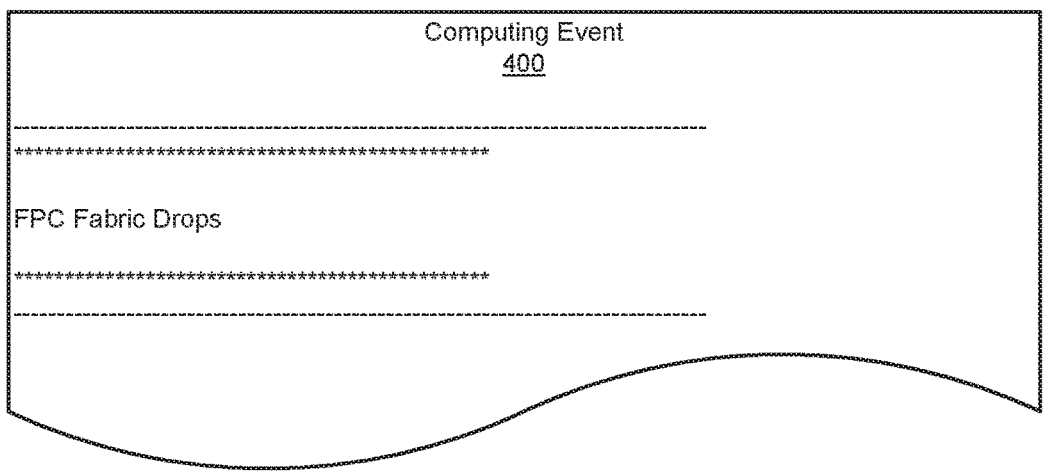
FIG. 4 is an illustration of an exemplary computing event that is indicative of a networking malfunction within a network node.

The systems described herein may perform step 340 in a variety of ways and/or contexts. In some examples, debugging module 110 may perform the set of debugging steps by checking and/or determining whether certain conditions specified in the debugging template are observed within network node 202(1). As a specific example, detection module 104 may detect computing event 400 in FIG. 4. As illustrated in FIG. 4, computing event 400 may include and/or represent Flexible PIC Concentrator (FPC) traffic drops in connection with network node 202(1).

Figure 5:
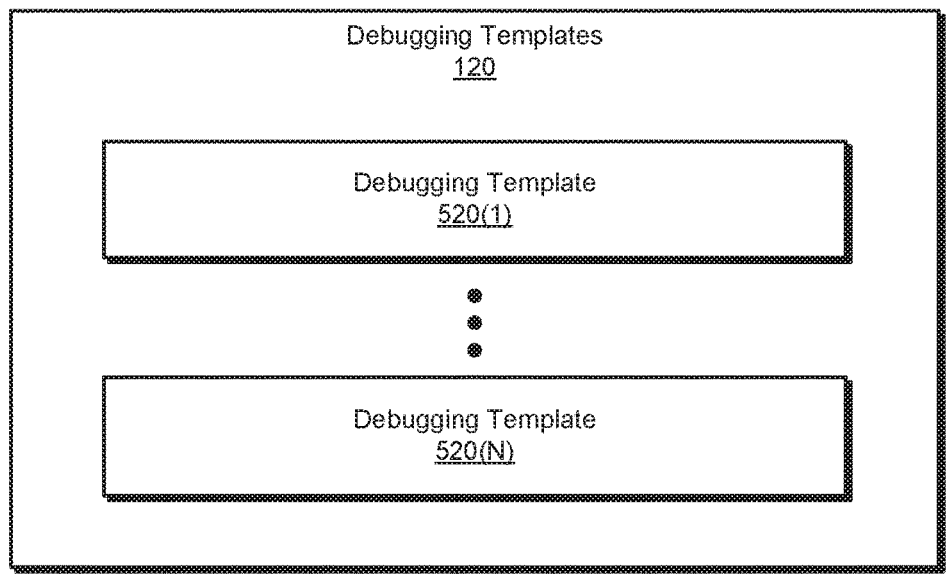
FIG. 5 is a block diagram of a collection of exemplary debugging templates.

In response to the detection of computing event 400, determination module 106 may determine all of the potential causes of FPC traffic drops by searching the knowledge base. In one example, determination module 106 may determine that one of the potential causes of FPC traffic drops is an ASIC error. In response to this determination, identification module 108 may search debugging templates 120 in FIG. 5 for any templates that correspond to such an ASIC error. As illustrated in FIG. 5, debugging templates 120 may include and/or represent debugging templates 520(1)-(N). During this search, identification module 108 may identify debugging template 520(1) as corresponding to the root cause of that ASIC error. Although illustrated as individual debugging templates in FIG. 5, debugging templates 520(1)-(N) may alternatively represent distinct portions, branches, and/or sub-templates within a single debugging template.

Figure 6:
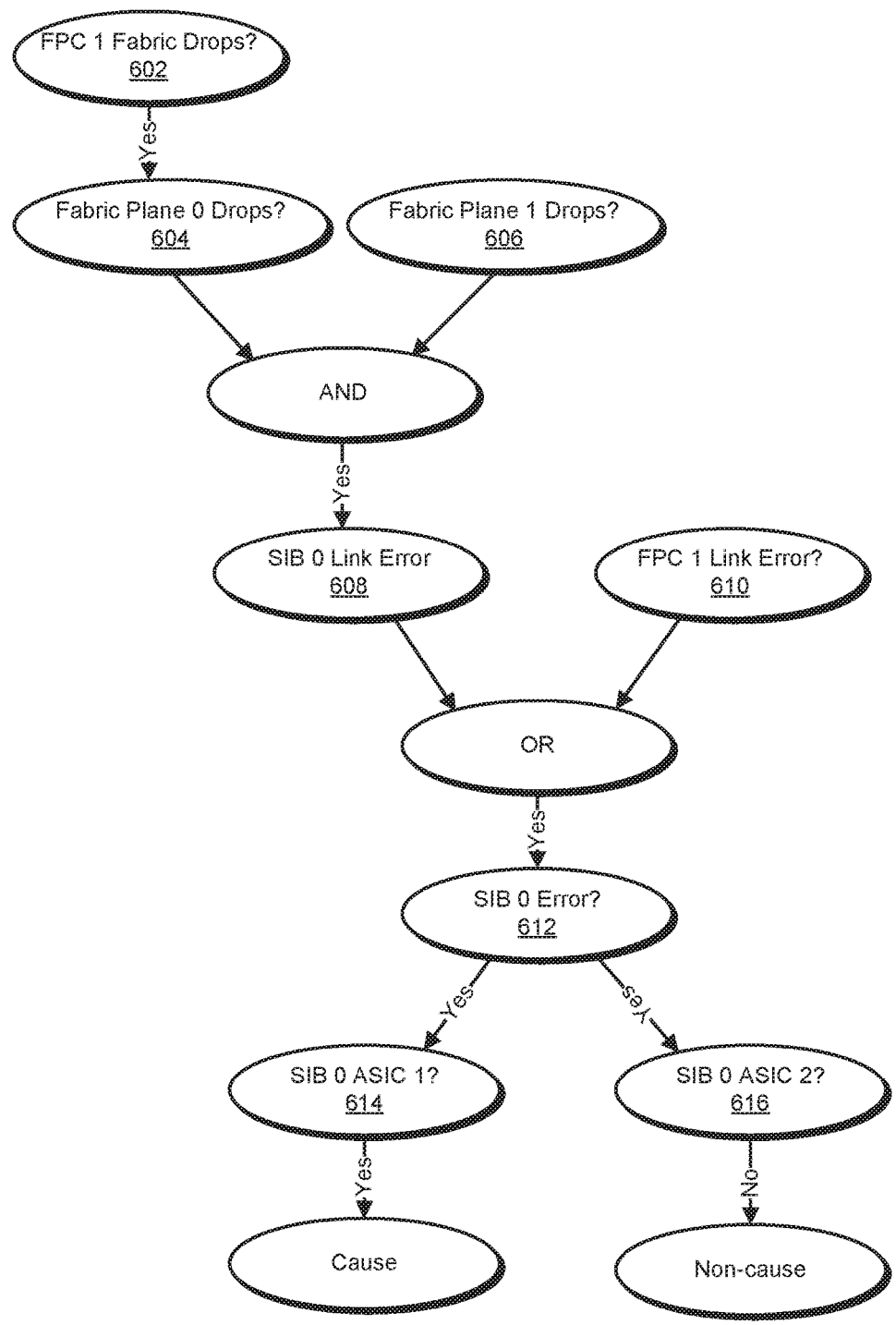
FIG. 6 is a flow diagram of an exemplary set of debugging steps defined by a debugging template.

Debugging module 110 may then perform the set of debugging steps defined in debugging template 520(1) in FIG. 6 to determine whether that ASIC error led and/or contributed to the detected FPC traffic drops. In one example, identification module 108 may serve as a network visualizer that identifies the topology and/or configuration of network 204. For example, identification module 108 may identify certain network nodes included in network 204. Additionally or alternatively, identification module 108 may identify certain routes and/or paths that facilitate communication among the network nodes.

In some examples, identification module 108 may identify the connectivity status of each of the network nodes relative to one another to determine which network nodes are able to communicate with one another. In one example, identification module 108 may further identify the configuration of one or more of network nodes 202(1)-(N) by enumerating various hardware components incorporated in the network node(s). For example, identification module 108 may identify network node 202(1) as a JUNIPER NETWORKS chassis that includes various switches and/or routers. These switches and/or routers may include various line cards, PICs, FPCs, FRUs, Switch Interface Boards (SIBS), control boards, routing engines, communication ports, fan trays, connector interface panels, combinations and/or variations of one or more of the same, and/or any other suitable hardware components that collectively enable network node 202(1) to facilitate communication between computing devices.

Continuing with this example, identification module 108 may identify the source of the FPC traffic drops as a specific router installed on the chassis. Identification module 108 may then enumerate all of the hardware components that are relevant to the Root Cause Analysis (RCA) within that router. For example, identification module 108 may enumerate and/or identify 8 different FPCs installed on that router.

Debugging module 110 may then perform debugging steps 602-616 in FIG. 6 included in debugging template 520(1) in FIG. 6.

As illustrated in FIG. 6, debugging module 110 may determine that traffic drops are occurring on and/or have been observed by FPC 1 (step 602). Debugging module 110 may further determine that the traffic drops are occurring on and/or have been observed by both Fabric Plane 0 and Fabric Plane 1 (steps 604 and 606). Since Fabric Planes 0 and 1 are located on SIB 0, debugging module 110 may determine that a link error has occurred on SIB 0 (step 608). Additionally or alternatively, debugging module 110 may determine that a link error has occurred on FPC 1 (step 610).

Continuing with this example, debugging module 110 may determine that a link error on either SIB 0 or FPC 1 indicates that SIB 0 is experiencing a networking malfunction (step 612). As a result, debugging module 110 may attempt to identify which ASIC on SIB 0 is experiencing the networking malfunction. For example, debugging module 110 may determine that ASIC 1 on SIB 0 is experiencing the error (step 614). In this example, debugging module 110 may determine that ASIC 2 on SIB 0 is not experiencing the error (step 616).

Figure 7:
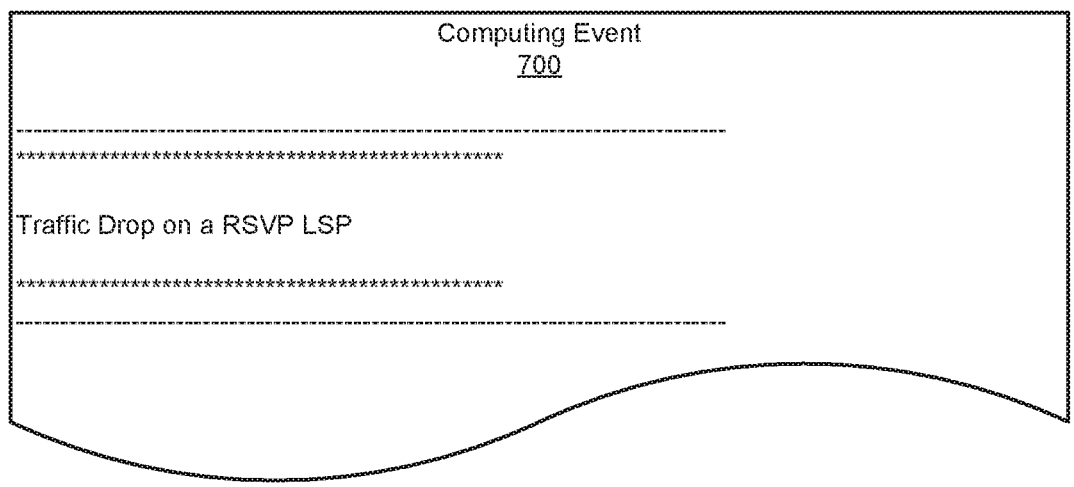
FIG. 7 is an illustration of an exemplary computing event that is indicative of a networking malfunction within a network node.

As another example, detection module 104 may detect computing event 700 in FIG. 7. As illustrated in FIG. 7, computing event 700 may include and/or represent a traffic drop on a Resource reSerVation Protocol (RSVP) Label-Switched Path (LSP). In response to this detection, debugging module 110 may perform debugging steps 802-810 in FIG. 8 included in debugging template 520(N) in FIG. 8 across the network nodes within the RSVP LSP.

Figure 8:
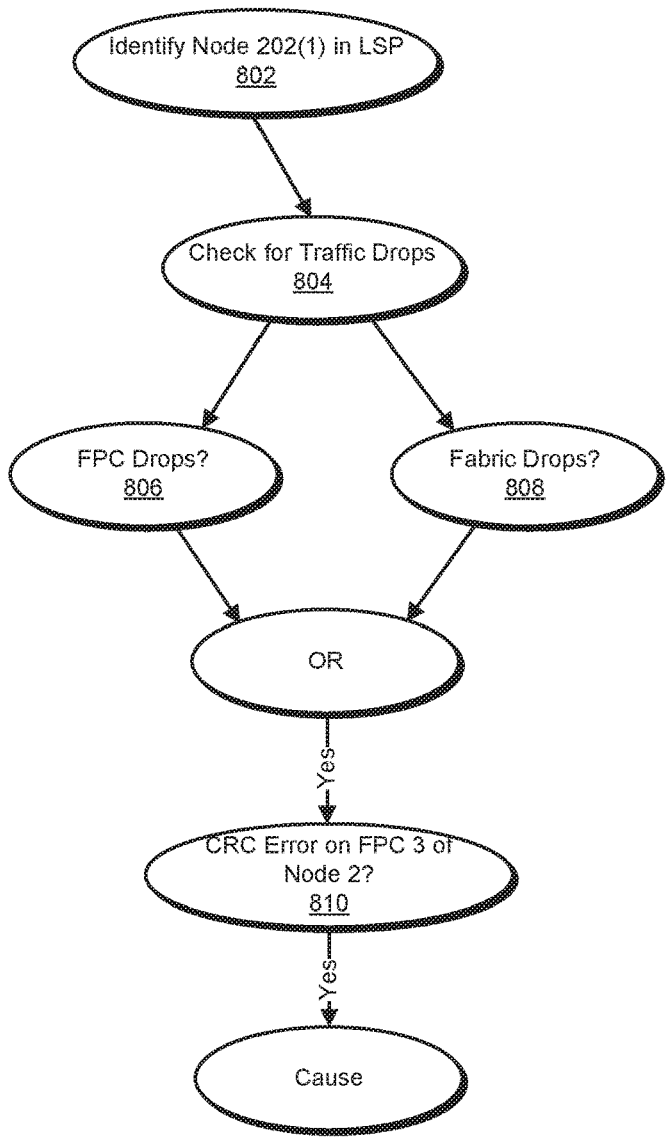
FIG. 8 is a flow diagram of an exemplary set of debugging steps defined by a debugging template.

As illustrated in FIG. 8, debugging module 110 may identify network node 202(1) within the RSVP LSP (step 802). Debugging module 110 may then check the relevant hardware components of network node 202(1) for any traffic drops (step 804). In one example, this check may involve searching for any FPC traffic drops and/or fabric traffic drops by reviewing the corresponding logs (steps 806 and 808). In the event that either FPC 3 or a corresponding fabric of network node 202(1) is experiencing traffic drops, debugging module 110 may determine that these traffic drops resulted from a Cyclic Redundancy Check (CRC) error on FPC 3 of network node 202(1).

Returning to FIG. 3, at step 350 one or more of the systems described herein may determine, based at least in part on the set of debugging steps defined by the debugging template, that the networking malfunction resulted from the potential cause. For example, debugging module 110 may, as part of server 206 and/or network node 202(1), determine that the networking malfunction resulted at least in part from the potential cause to which the debugging template corresponds by executing the set of debugging steps. In other words, in the event that the conditions outlined in the debugging steps are met, debugging module 110 may determine that the networking malfunction resulted at least in part from that debugging template's root cause.

The systems described herein may perform step 350 in a variety of ways and/or contexts. In some examples, debugging module 110 may determine that that the networking malfunction resulted at least in part from the potential cause by traversing the tree data structure that includes and/or represents the set of debugging steps. For example, debugging module 110 may execute the various debugging steps within the debugging template. By executing these debugging steps in this way, debugging module 110 may confirm whether a certain set of conditions are present and/or exist within network node 202(1). The presence and/or existence of this set of conditions may be indicative and/or suggestive of the root cause of the networking malfunction.

In one example, debugging module 110 may continue executing the debugging steps until reaching a leaf node (e.g., a node with no children) within the tree data structure. Upon reaching such a leaf node, debugging module 110 may determine that the hardware component involved in the debugging step represented by that leaf node is the root cause of the networking malfunction. For example, debugging module 110 may identify debugging step 614 in FIG. 6 as a leaf node within the tree data structure of debugging template 520(1) in FIG. 6. In this example, since (1) the error originated from ASIC 1 on SIB 0 and (2) debugging step 614 is a leaf node, debugging module 110 may determine that ASIC 1 on SIB 0 is the root cause of the networking malfunction and/or computing event 400. In contrast, since the ASIC 2 on SIB 0 is not contributing to the error, debugging module 110 may determine that ASIC 2 on SIB 0 is not a root cause of the underlying networking malfunction and/or computing event 400 in FIG. 4.

As another example, debugging module 110 may identify debugging step 810 in FIG. 8 as a leaf node within the tree data structure of debugging template 520(N) in FIG. 8. In this example, since the traffic drops resulted from a Cyclic Redundancy Check (CRC) error on FPC 3 of network node 202(1), debugging module 110 may determine that FPC 3 is the root cause of the underlying networking malfunction and/or computing event 700 in FIG. 7.

In some examples, upon identifying the root cause of the underlying networking malfunction, one or more of modules 102 may initiate a remedial action intended to facilitate fixing the networking malfunction. For example, remediation module 116 may, as part of server 206 and/or network node 202(1), notify a network administrator about the root cause of the networking malfunction. In this example, the notification may include instructions on how to repair the networking malfunction by addressing the root cause. Additionally or alternatively, remediation module 116 may remedy the networking malfunction by addressing the root cause via computer and/or robotic automation.

In some examples, database modules 112 may track and/or account for the results of the RCA to notify a network administrator and/or automatically update one or more of debugging templates 120 by way of machine learning. For example, database module 112 may add an entry identifying and/or indicating the root cause of the networking malfunction to a results database (not illustrated in FIG. 2) and/or the knowledge base. In this example, database module 112 may update the debugging template used in the RCA (and/or another debugging template) based at least in part on the entry. By updating the debugging template in this way, database module 112 may apply machine learning to improve the accuracy and/or efficiency of the automated debugging process.

In some examples, one or more of the systems described herein may correlate multiple computing events and/or root causes across multiple network nodes. For example, correlation module 114 may, as part of server 206 and/or network node 202(1), correlate multiple computing events and/or root causes across network nodes 202(1)-(N). In this example, correlation module 114 may link multiple computing events occurring across network nodes 202(1)-(N) to the same root cause by way of correlation. Additionally or alternatively, correlation module 114 may link multiple root causes together by way of correlation as each being capable of causing the same alarm and/or event.

By doing so, correlation module 114 may facilitate faster root cause convergence and/or identification. For example, correlation module 114 may identify a particular problem and then dynamically determine the flow of debugging steps. Correlation module 114 may then converge on the root cause of the problem faster and/or more precisely by feeding back additional steps and/or information to the debugging process.

Figure 9:
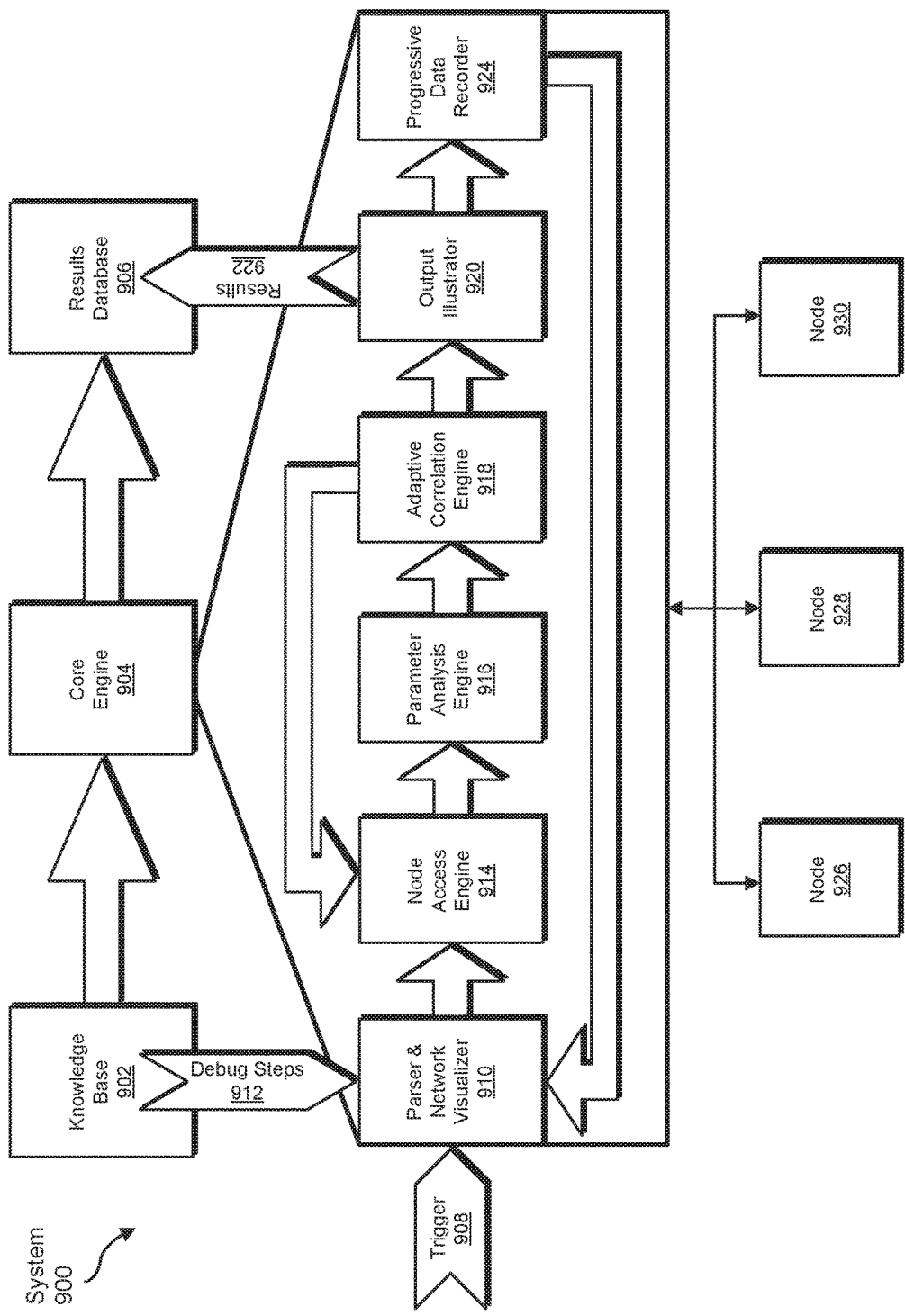
FIG. 9 is a block diagram of an exemplary system for debugging networking malfunctions within network nodes.

As discussed above in connection with FIGS. 1-8, the systems and methods described herein may be able to debug networking malfunctions within network nodes by applying debugging templates to confirm and/or refute certain potential causes of such networking malfunctions. FIG. 9 illustrates an exemplary system 900 for debugging networking malfunctions within network nodes. As illustrated in FIG. 9, system 900 may include a knowledge base 902. In one example, knowledge base 902 may include a set of debug steps that facilitate determining whether an alarm and/or event resulted from one or more potential causes.

In addition, system 900 may include a core engine 904 that performs and/or executes certain debug steps included in knowledge base 902. In one example, core engine 904 may be triggered by an alarm and/or event. Additionally or alternatively, core engine 904 may be manually initiated by a human operator via a command-line interface and/or web interface.

System 900 may also include a results database 906 that stores and/or maintains the results of certain debugging operations. In one example, results database 906 may facilitate comparing the results from different debugging operations to analyze and/or highlight key changes across various iterations of the same or similar alarms and/or the same or similar root causes. In this example, results database 906 may be indexed by a configuration file key and/or the date of execution.

As illustrated in FIG. 9, a trigger 908 may initiate a debugging operation. In one example, trigger 908 may include and/or represent an alarm and/or event. Additionally or alternatively, trigger 908 may include and/or represent a manual initiation by a human operator.

As illustrated in FIG. 9, core engine 904 may include a parser & network visualizer 910. In response to trigger 908, parser & network visualizer 910 may parse knowledge base 902 to identify and/or retrieve debug steps 912. In one example, debug steps 912 may correspond to trigger 908. In this example, trigger 908 may cause parser & network visualizer 910 to obtain debug steps 912 from knowledge base 902.

Additionally or alternatively, parser & network visualizer 910 may identify the network topology. For example, parser & network analyzer 910 may identify the network topology as a hierarchical tree structure that includes four levels: (1) node, (2) element, (3) group, and (4) debug steps. In this example, the node level may include and/or identify the physical entity (such as a router, switch, and/or chassis) of the node. The element level may include and/or identify the various hardware and/or FRUs (such as line cards, PICs, FPCs, control boards, and/or routing engines) within the physical entity of the node. Additionally or alternatively, the element level may include and/or identify one or more software modules (such as event and/or alarm subsystems).

Continuing with this example, the group level may include and/or represent a logical entity. In this example, the logical entity may include various debug-units that have been grouped together by certain correlations and/or dependencies. For example, certain alarms and/or events may be grouped together due at least in part to their potential to have resulted from the same root cause.

Finally, the debug steps level may include and/or represent the executable instructions that contain the definition of suspicious values and/or parameters. For example, the debug steps may, when executed, identify certain values and/or parameters that are out-of-range and/or exceed a set limit. Additionally or alternatively, the debug steps may identify certain events that occurred and/or entries within a log during a particular time interval.

As illustrated in FIG. 9, core engine 904 may include a node access engine 914. Once the network topology has been identified, node access engine 914 may access certain specifics of one or more levels within the network topology. In one example, node access engine 914 may include and/or represent a plugin that gains entry and/or access to certain components within the nodes of the network topology. For example, node access engine 914 may access the nodes (e.g., nodes 926, 928, and 930) by way of authentication credentials. In this example, node access engine 914 may identify and/or access any of the FRUs included on the node and/or any of the data logs recorded in connection with such FRUs.

As illustrated in FIG. 9, core engine 904 may also include a parameter analysis engine 916. In one example, parameter analysis engine 916 may analyze any information collected from these nodes by node access engine 914. For example, parameter analysis engine 916 may check for an out-of-bounds attribute of a command output. Additionally or alternatively, parameter analysis engine 916 may check for certain strings entered in a log recorded within a specific timespan. Parameter analysis engine 916 may also check for a specific alarm and/or event that occurred on a node.

As illustrated in FIG. 9, core engine 904 may further include an adaptive correlation engine 918. In one example, adaptive correlation engine 918 may identify those debug steps that have been grouped together at the group level of the hierarchical tree structure. In this example, adaptive correlation engine 918 may determine whether at least one of the debug steps within the group resulted in a specific output and/or condition. In the event that at least one of the debug steps within the group resulted in the specific output and/or condition, adaptive correlation engine 918 may classify that group as a "hit". In contrast, in the event that none of the debug steps within the group resulted in the specific output and/or condition, adaptive correlation engine 918 may classify that group as a "miss".

Continuing with this example, core engine 904 may decide to execute additional debug steps in the event that one or more steps from a previously executed group resulted in a "hit". In contrast, adaptive correlation engine 918 may decide to skip certain debug steps in the event that one or more steps from a previously executed group resulted in a "miss". In either case, adaptive correlation engine 918 may provide feedback to node access engine 914. This feedback may indicate whether to execute additional debug steps and/or whether to cease execution.

By providing this feedback to node access engine 914 in this way, adaptive correlation engine 918 may facilitate faster root cause convergence and/or identification. For example, adaptive correlation engine 918 may identify a particular problem and then dynamically determine the flow of debugging steps. Adaptive correlation engine 918 may then converge on the root cause of the problem faster and/or more precisely by way of the feedback loop to node access engine 914.

As illustrated in FIG. 9, core engine 904 may additionally include an output illustrator 920. In some examples, output illustrator 920 may generate and/or illustrate the results of the debugging operation in a particular format. In one example, results 922 may be presented in a report that summarizes the key information discovered during the debugging operation. Additionally or alternatively, results 922 may be presented as a graphical representation and/or illustration (such as a color-coded tree structure) in human-readable form. Results 922 may also include certain instructions for a human operator on how to remedy the root cause identified during the debugging operation.

As illustrated in FIG. 9, core engine 904 may finally include a progressive data recorder 924. In one example, progressive data recorder 924 may identify certain information that facilitates performing further debug steps. In this example, the information may include and/or represent necessary input for the further debug steps. In other words, progressive data recorder 924 may recursively feed the results and/or discoveries from one iteration of debug steps back into parser & network visualizer 910.

By feeding the results and/or discoveries from that iteration back into parser & network visualizer 910 in this way, progressive data recorder 924 may enable the other components of core engine 904 to perform one or more subsequent iterations. In doing so, progressive data recorder 924 may enable the components of core engine 904 to converge on the root cause of an alarm and/or event.

Figure 10:
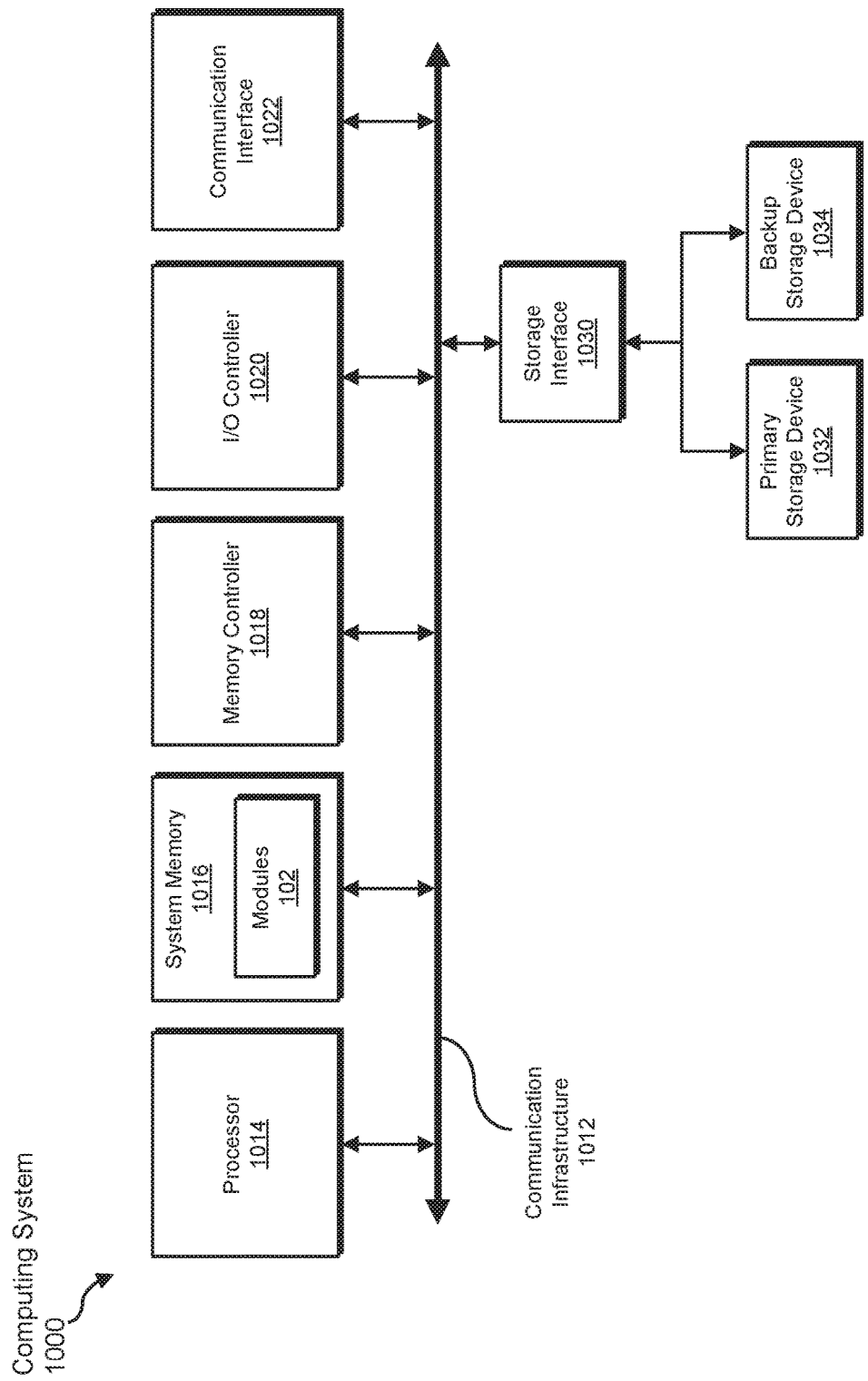
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein. In one example, computing system 1000 may include and/or represent an apparatus that performs and/or constitutes a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an ASIC, a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations. In one example, system memory 1016 may include and/or store one or more of modules 102 and/or debugging templates 120 from FIG. 1.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    building a collection of debugging templates that comprises a first debugging template that corresponds to a first potential cause of a certain networking malfunction and a second debugging template that corresponds to a second potential cause of the certain networking malfunction by:
        receiving user input from a user of a network;
        creating, based at least in part on the user input, the first debugging template that defines a first set of debugging steps that, when performed by a computing system, enable the computing system to determine whether the first potential cause led to the certain networking malfunction; and
        creating, based at least in part on the user input, the second debugging template that defines a second set of debugging steps that, when performed by the computing system, enable the computing system to determine whether the second potential cause led to the certain networking malfunction;
    detecting a computing event that is indicative of the certain networking malfunction within a network node included in the network;
    determining, based at least in part on the computing event, potential causes of the certain networking malfunction, wherein the potential causes comprise the first potential cause of the certain networking malfunction and the second potential cause of the certain network malfunction;
    performing the first set of debugging steps defined by the first debugging template that corresponds to the first potential cause, wherein the first debugging template comprises a generic debugging template that enables the computing system to determine that the certain networking malfunction resulted from the first potential cause irrespective of a software configuration of the network node; and
    determining, based at least in part on the first set of debugging steps defined by the first debugging template, that the certain networking malfunction resulted from the first potential cause.

2. The method of claim 1, further comprising identifying the first debugging template by:
    searching the collection of debugging templates for any debugging templates that correspond to any potential causes of the certain networking malfunction; and
    identifying, during the search, the first debugging template that defines the first set of debugging steps that enable the computing system to determine whether the first potential cause led to the certain networking malfunction.

3. The method of claim 1, wherein performing the first set of debugging steps defined by the first debugging template comprises selecting the first debugging template to test whether the certain networking malfunction resulted at least in part from the first potential cause; and
    further comprising:
        selecting the second debugging template to test whether the certain networking malfunction resulted at least in part from the second potential cause; and
        performing the second set of debugging steps defined by the second debugging template that corresponds to the second potential cause.

4. The method of claim 1, wherein the generic debugging template that enables the computing system to determine that the certain networking malfunction resulted from the first potential cause irrespective of a hardware configuration of the network node.

5. The method of claim 1, wherein the first debugging template comprises a debugging template that includes at least one configuration-specific debugging step.

6. The method of claim 5, further comprising identifying a configuration of the network node; and
    wherein performing the first set of debugging steps defined by the first debugging template comprises:
        identifying at least one debugging step that corresponds to the configuration of the network node; and
        executing the debugging step on the network node to test whether the certain networking malfunction resulted at least in part from the first potential cause.

7. The method of claim 6, wherein identifying the debugging step that corresponds to the configuration of the network node comprises:
    enumerating a plurality of hardware components of the network node; and
    identifying, within the first debugging template, a debugging step that corresponds to at least one of the hardware components.

8. The method of claim 7, wherein the plurality of hardware components of the network node comprise at least one of:
    a router;
    a switch;
    a chassis;
    a field-replaceable unit;
    a line card; and
    a physical interface card.

9. The method of claim 1, further comprising notifying at least one administrator that the certain networking malfunction resulted from the first potential cause.

10. The method of claim 1, further comprising remedying the certain networking malfunction by addressing the first potential cause.

11. The method of claim 1, further comprising:
adding, to a results database, an entry indicating that the certain networking malfunction resulted from the first potential cause; and
updating at least one of the debugging templates based at least in part on the entry indicating that the certain networking malfunction resulted from the first potential cause.

12. A system comprising:
a database module, stored in memory, that builds a collection of debugging templates that comprises a first debugging template that corresponds to a first potential cause of a certain networking malfunction and a second debugging template that corresponds to a second potential cause of the certain networking malfunction by:
receiving user input from a user of a network;
creating, based at least in part on the user input, the first debugging template that defines a first set of debugging steps that, when performed by a computing system, enable the computing system to determine whether the first potential cause led to the certain networking malfunction; and
creating, based at least in part on the user input, the second debugging template that defines a second set of debugging steps that, when performed by the computing system, enable the computing system to determine whether the second potential cause led to the certain networking malfunction;
a detection module, stored in memory, that detects a computing event that is indicative of the certain networking malfunction within a network node included in the network;
a determination module, stored in memory, that determines, based at least in part on the computing event, potential causes of the certain networking malfunction, wherein the potential causes comprise the first potential cause of the certain networking malfunction and the second potential cause of the certain network malfunction;
a debugging module, stored in memory, that:
performs the first set of debugging steps defined by the first debugging template that corresponds to the first potential cause, wherein the first debugging template comprises a generic debugging template that enables the computing system to determine that the certain networking malfunction resulted from the first potential cause irrespective of a software configuration of the network node; and
determines, based at least in part on the first set of debugging steps defined by the first debugging template, that the certain networking malfunction resulted from the first potential cause; and
at least one physical processor that executes the database module, the detection module, the determination module, and the debugging module.

13. The system of claim 12, further comprising an identification module, stored in memory, that:
searches the collection of debugging templates for any debugging templates that correspond to any potential causes of the certain networking malfunction; and
identifies, during the search, the first debugging template that defines the first set of debugging steps that enable the computing system to determine whether the first potential cause led to the certain networking malfunction.

14. The system of claim 12, wherein the debugging module:
selects the second debugging template to test whether the certain networking malfunction resulted at least in part from the second potential cause; and
performs the second set of debugging steps defined by the second debugging template that corresponds to the second potential cause.

15. The system of claim 12, wherein the generic debugging template enables the computing system to determine that the certain networking malfunction resulted from the first potential cause irrespective of a hardware configuration of the network node.

16. The system of claim 12, wherein the first debugging template comprises a debugging template that includes at least one configuration-specific debugging step.

17. The system of claim 16, further comprising an identification module, stored in memory, that identifies a configuration of the network node; and
wherein the debugging module:
identifies at least one debugging step that corresponds to the configuration of the network node; and
executes the debugging step on the network node to test whether the certain networking malfunction resulted at least in part from the first potential cause.

18. An apparatus comprising:
a memory device that stores a collection of debugging templates that comprises a first debugging template that corresponds to a first potential cause of a certain networking malfunction and a second debugging template that corresponds to a second potential cause of the certain networking malfunction, wherein:
the first debugging template defines a first set of debugging steps that, when performed by a computing system, enable the computing system to determine whether the first potential cause led to the certain networking malfunction; and
the second debugging template defines a second set of debugging steps that, when performed by the computing system, enable the computing system to determine whether the second potential cause led to the certain networking malfunction;
a processing unit communicatively coupled to the memory device, wherein the processing unit:
detects a computing event that is indicative of the certain networking malfunction within a network node included in the network;
determines, based at least in part on the computing event, potential causes of the certain networking malfunction, wherein the potential causes comprise the first potential cause of the certain networking malfunction and the second potential cause of the certain network malfunction;
performs the first set of debugging steps defined by the first debugging template that corresponds to the first potential cause, wherein the first debugging template comprises a generic debugging template that enables the computing system to determine that the certain networking malfunction resulted from the first potential cause irrespective of a software configuration of the network node; and
determines, based at least in part on the first set of debugging steps defined by the first debugging template, that the certain networking malfunction resulted from the first potential cause.

\* \* \* \* \*

UNITED STATES PATENT AND TRADEMARK OFFICE
CERTIFICATE OF CORRECTION

PATENT NO. : 10,169,133 B2
APPLICATION NO. : 15/138458
DATED : January 1, 2019
INVENTOR(S) : Mukul Golash et al.

Page 1 of 1

It is certified that error appears in the above-identified patent and that said Letters Patent is hereby corrected as shown below:

In the Claims

In Column 20, Line 32, Claim 4, after "template" delete "that".

Signed and Sealed this
Nineteenth Day of March, 2019

Andrei Iancu
*Director of the United States Patent and Trademark Office*